United States Patent [19]
Sandercock

[11] 3,729,261
[45] Apr. 24, 1973

[54] STABILIZED MULTIPASS INTERFEROMETER

[75] Inventor: John Riddle Sandercock, Affoltern, Switzerland

[73] Assignee: RCA Corporation, New York, N.Y.

[22] Filed: June 21, 1971

[21] Appl. No.: 154,719

[52] U.S. Cl..................................356/112, 331/94.5
[51] Int. Cl.............................G01b 9/02, H01s 3/00
[58] Field of Search...........................356/112, 106; 331/94.5

[56] References Cited

UNITED STATES PATENTS 3,252,110  5/1966  Gustafson et al....................331/94.5

OTHER PUBLICATIONS

"Double Passed Fabry–Perot Interferometer," 51JOSA398.

*Primary Examiner*—Ronald L. Wibert
*Assistant Examiner*—Conrad Clark
*Attorney*—Edward J. Norton

[57] ABSTRACT

A Fabry-Perot interferometer is multipassed to provide improved contrast for Brillouin spectra measurements, the interferometer being provided with a stabilization system which compensates for both thermal and mechanical drift of the interferometer mirrors with respect to each other. While the instrument is scanning the frequency spectrum of the multi-passed beam of incident wave energy, each pass being displaced with respect to the next adjacent pass, the stabilization system maintains the mirrors within the required degree of parallelism.

18 Claims, 7 Drawing Figures

INVENTOR.
John R. Sandercock

Fig.5

Patented April 24, 1973

PARALLELISM OF MIRRORS 24 AND 26 VERSUS TRANSMISSION INTENSITY

Fig.7

INVENTOR.
John R. Sandercock
BY
ATTORNEY

3,729,261

STABILIZED MULTIPASS INTERFEROMETER

BACKGROUND OF THE INVENTION

This invention relates to interferometers, and, more particularly, to means for improving the contrast of Fabry-Perot interferometers.

When light passes through a material, a fraction is absorbed and re-emitted as diffusely scattered light. Of this scattered light most has the frequency of the incident light (the Rayleigh spectra) and the rest is observed to have components with slightly shifted frequencies (the Raman and Brillouin spectra) as a result of the interaction between the light and the internal excitations of the material under examination. The study of the frequency shift of scattered light is thus of interest as a means of obtaining information about material structure.

While a conventional grating spectrometer may be used to obtain Raman spectra in back-scattering from non-transparent material, it is not straight forward to obtain the equivalent Brillouin spectra where a high resolution interferometer is required. The grating spectrometer can detect small Raman intensities provided that these are sufficiently removed in frequency from the strong Rayleigh signal. On the other hand, the interferometer, while having a much improved frequency resolution is nonetheless limited in its small signal resolution by the minimum Rayleigh light transmitted midway between the transmission maxima.

Where frequency shifts are less than about 25 cm.$^{-1}$, a commonly used high resolution instrument for these measurements is the Fabry-Perot interferometer although this is insufficient for the majority of back scattering measurements due to its poor contrast. Presently there are no known instruments which can simply and economically resolve this small signal analysis problem.

Significant improvement over a conventional interferometer can be obtained by passing the beam to be examined twice through the interferometer. Such a double pass system has been suggested in the prior art but has met with little success. In particular, in the prior art system the incident beam is returned through the interferometer along the identical path and, thus, to prevent interference between the beams, the return beam is separated from the original beam using polarization techniques. Still other systems utilize interferometers in series. However, such other systems have problems associated with alignment of the instruments, synchronized scanning and mirror stability.

Another problem in utilizing even a single interferometer for analysis of light waves is that of stability of the mirrors. In the Fabry-Perot interferometer a pair of mirrors are arranged in precise parallel alignment. However, the parallel alignment of the mirrors is affected by both temperature fluctuation and mechanical drift. To stabilize the mirrors, one solution has been to stabilize the temperature of the instrument wherein the temperature is maintained within 0.001°C. However, these systems require precise control and expensive and complex equipment. At the same time, however, thermal stabilization cannot cure mechanical drift. Thus, alignment of the mirrors with respect to mechanical drifts still is an operation that is independent of the thermal stabilization system.

SUMMARY OF THE INVENTION

In accordance with the present invention a single Fabry-Perot interferometer includes at least one retroreflector coupled to the interferometer to obtain at least two passes of incident wave energy on the pair of mirrors in the interferometer. The beam of each pass is displaced from the other beams that distance by which the wave energy of each pass is processed by the interferometer substantially without interaction with the wave energy of the other pass.

Means are coupled to the mirrors for stabilizing the angular orientation of the mirrors with respect to each other to within a given degree of parallelism beyond which degree the level of the output signal would be substantially reduced.

A feature of the stabilization means includes first means coupled to the mirrors for cyclically rotating the mirrors with respect to each other by a given incremental amount in one direction about an axis from a mean angular position during a first portion of each cycle and by substantially the same given incremental amount in an opposite direction about that axis from the mean angular position about a second portion of each cycle. Means are provided for measuring the output signal.

Additional means are provided which include storage means coupled to the rotating and measuring means for comparing the measured output signals produced during the first portion of the cycle with the measured output signal produced during the second portion of that cycle to generate an error signal manifesting the algebraic difference between the compared difference.

Other means are coupled to the rotating and error signal generating means and responsive to the error signal for shifting the mean angular position of the mirrors in accordance with the error signal, which shifting tends to reduce the magnitude of the error signal whereby the mean position of the mirrors is shifted toward a predetermined value of angular orientation at which the output signal is a maximum.

DESCRIPTION OF THE PREFERRED EMBODIMENT

Figure 1:
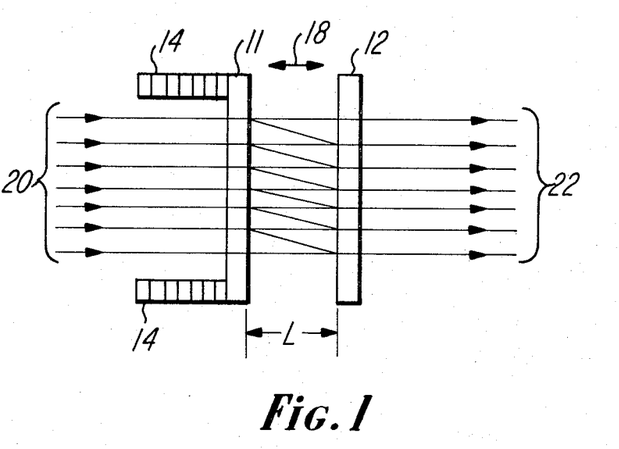
FIG. 1 is a schematic diagram illustrating a Fabry-Perot interferometer.

In FIG. 1, there is shown a Fabry-Perot interferometer having a pair of spaced parallel mirrors 10 and 12 as known in the interferometer art. The mirrors are uniformly spaced from each other a distance L. The mirrors 10 and 12 may be fixed in spaced relationship with respect to each other a given distance L, but, as shown, are movable with respect to each other to vary the distance L to change the frequency response of the interferometer.

In FIG. 1, the mirrors are shown movable with respect to each other in the direction of arrow 18 by means of transducers 14 secured to mirror 10, the other mirror 12 being generally not capable of translation; but, in accordance with the present invention, as will be described, is capable of being aligned in parallelism with mirror 12.

Incident beam of wave energy 20 is caused to impinge upon the mirrors, and, the mirrors being partially reflective and partially transmissive, permit the light beams to enter the resonant optical cavity formed by mirrors 10 and 12. Thereafter, interference occurs between various portions of the incident beam, which interference causes the output signal 22 to have an intensity that is a function of spacing L. A signal, not shown, is applied to transducers 14 to cause mirror 10 to be displaced in the direction of arrow 18 such that the output signal 22 scans a particular desired frequency spectrum of the incident wave energy 20. This interferometer is known as a scanning Fabry-Perot interferometer.

Figure 2:
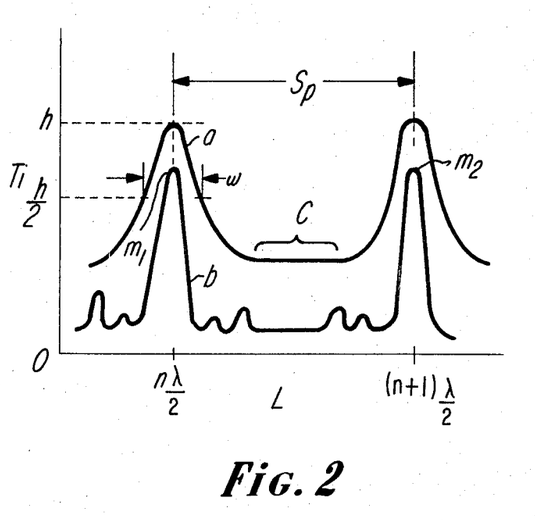
FIG. 2 are waveforms useful in explaining the invention.

The magnitude of the output signal 22 is a function of the spacing L between mirrors 10 and 12, with a transmission maximum for output signal 22 occurring when the condition $L = n(\lambda/2)$ is satisfied, n being an integral number. In FIG. 2 there is shown a plot of transmission $T_i$ versus mirror spacing L wherein a waveform maximum occurs for each integral value of $2L/\lambda$, the waveform a of FIG. 2 being produced by a typical scanning Fabry-Perot interferometer. The L coordinate thus represents the frequency of a given transmission $T_i$ of the output signal 22.

Waveform a of FIG. 2 can be shown to be described by the relationship $$T(\lambda) = T_{max} \cdot \frac{1}{1 + \frac{4F^2}{\pi^2}\sin^2\frac{2\pi L}{\lambda}} \quad (1),$$

where $T(\lambda)$ represents the signal transmission for a given wavelength $\lambda$. $T_{max}$ differs from unity due to the absorption in the mirror surface, imperfect surfaces and imperfect collimation on the incident beam and $F$ is the finesse to be described.

The finesse $F$ of an interferometer is a function of surface finesse $F_S$ and reflectivity finesse $F_R$ and cannot exceed the lowest of these figures. The finesse $F$ is the ratio of peak spacing $S_P$ of FIG. 2 of he two maximum transmission peaks a waveform a to peak width $w$ at half maximum heighth $h$. It can be shown that $F_R = (\pi R/1 - R)$ where R is the coefficient of reflectivity and $F_S = m/2$ where the mirrors are matched flat to a flatness of $\lambda/m$. In FIG. 2, a waveform a represents the output signal 22 of FIG. 1 when the input incident wave energy 20 is a beam of monochromatic light.

If instead of monochromatic light, light from a scattering experiment is incident on the interferometer the frequency shifted components of the output signal 22 will appear on either side of the Rayleigh peak as illustrated in FIG. 2 waveform b. Waveform b is typical of a Brillouin measurement where the inelastically scattered light may have an increased or decreased frequency due to absorption or emission respectively of an acoustic phonon which may be present in the material being examined. If the Rayleigh intensity in the light beam characterized by the frequency spectrum of waveform b of FIG. 2 was very large as in a back-scattering experiment and this light was to be passed through a scanning Fabry-Perot interferometer, the output signal would appear as in waveform a of FIG. 2 due to the poor contrast of a single interferometer. Thus the important Brillouin components would not be resolved by the Fabry-Perot interferometer. It is clear that bracketed portion c of waveform a has a much greater intensity than the maximum intensity of the frequency components of waveform b. The small signal resolution of the interferometer as represented by waveform a of FIG. 2 is clearly insufficient for utilization in a Brillouin measurement experiment, that is, to examine a waveform such as waveform b of FIG. 2.

This small signal resolution of the output signal is determined by the contrast ratio C which may be defined as the ratio of the maximum to minimum transmission. A weak signal may be detected by the interferometer only if the intensity of the weak signal is greater than $C^{-1}$ times the intensity of the neighboring strong signal. In equation (1), when the finesse F is much greater than 1, the contrast ratio C is shown by the relationship $C = 4F^2/\pi^2$ (2). Thus the contrast ratio C is determined solely by the finesse F of the mirrors, which is a function of mirror reflectivity or mirror flatness as the case may be as indicated above.

In practice, it can be shown that state of the art mirror construction yields a contrast of about $10^4$ when for back-scattering Brillouin spectra a contrast some orders of magnitude greater may be required. To illustrate the precision required of even a single interferometer the following description is presented.

The state of the mirror art is such that highest quality mirrors are matched flat to a degree of $\lambda/200$. From the equation $F_s = m/2$, it is seen that the best possible finesse is approximately 100 for visible light, and the contrast ratio $C$ from equation 2 is limited to less than $10^4$. For an instrument to properly operate, the mirrors must be aligned parallel to within limits of the surface quality. That is, across the extent of the mirrors processing the beam or beams of energy the mirrors must be maintained parallel within the degree of flatness required of the mirrors. With mirrors which are flat to within $\lambda/200$, the degree of parallelism of the mirrors with respect to each other thus is at least 50 angstroms. To provide temperature stability for this degree of parallelism the system must be maintained uniform in temperature to within 0.001°C and still further adjustments may be necessary for mechanical drift which is independent of temperature. A costly temperature stabilizer does not therefore necessarily completely stabilize an interferometer.

To overcome this problem, an interferometer in accordance with the present invention is provided which utilizes a single Fabry-Perot interferometer that is simple and economical to construct and yet meets the contrast required for examination of back-scattering light in a Brillouin analysis. The interferometer of the present invention accomplishes the above noted results through the use of two features. Firstly, the beam of wave energy is multipassed through the single interferometer at least two times to obtain the desired contrast ratio C. The final contrast is the product of the contrasts for each pass. These multipassed beams are displaced from each other as will be described. Secondly, the mirrors are electronically stabilized within the increased degree of parallelism.

Figure 3:
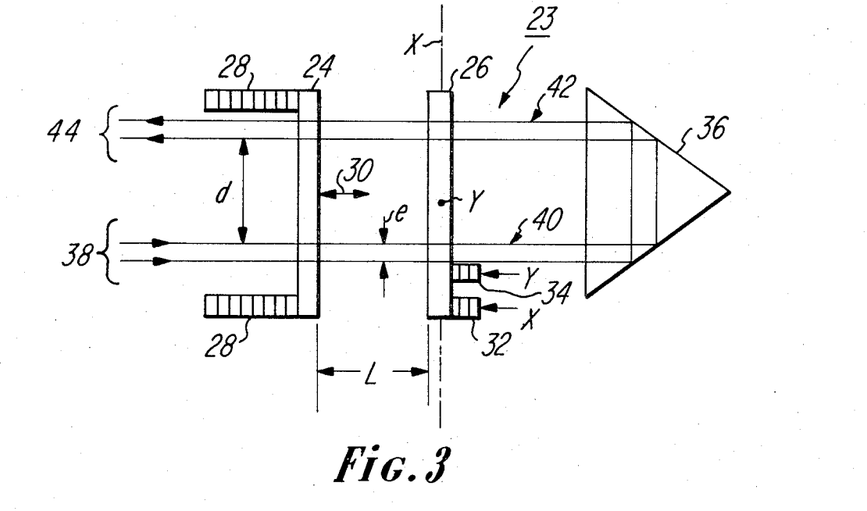
FIG. 3 is a schematic diagram of a Fabry-Perot interferometer including the multiple pass feature of the present invention.
Figure 4:
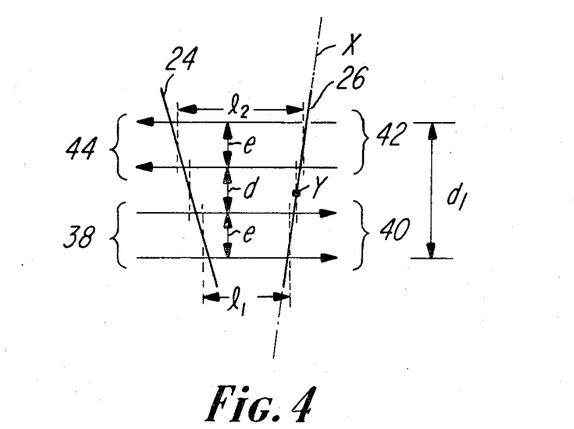
FIG. 4 is a diagram useful in explaining the relationships of the mirrors of the interferometer of FIG. 3.
Figure 5:
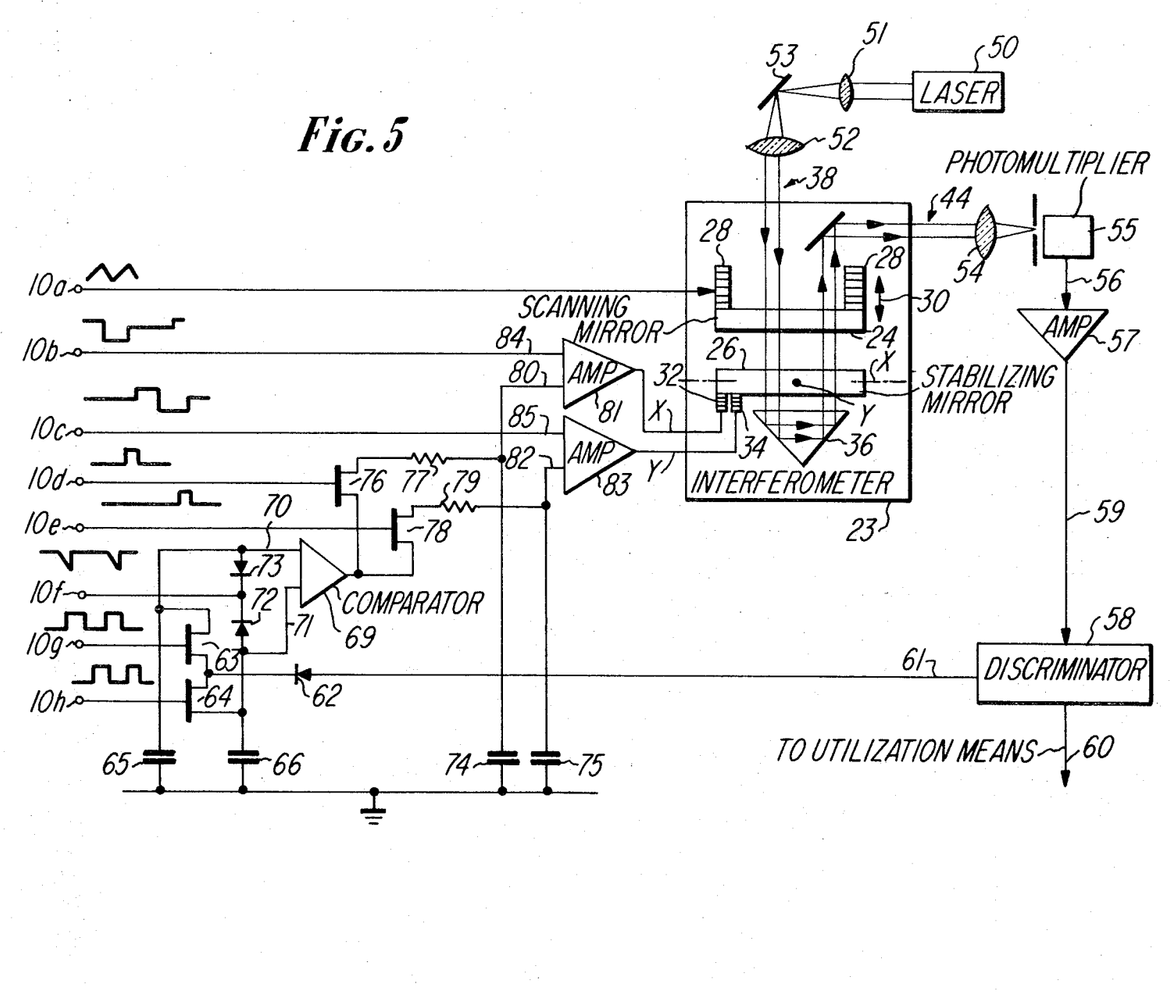
FIG. 5 is an embodiment of an interferometer in accordance with the present invention including a stabilizing system.
Figure 6:
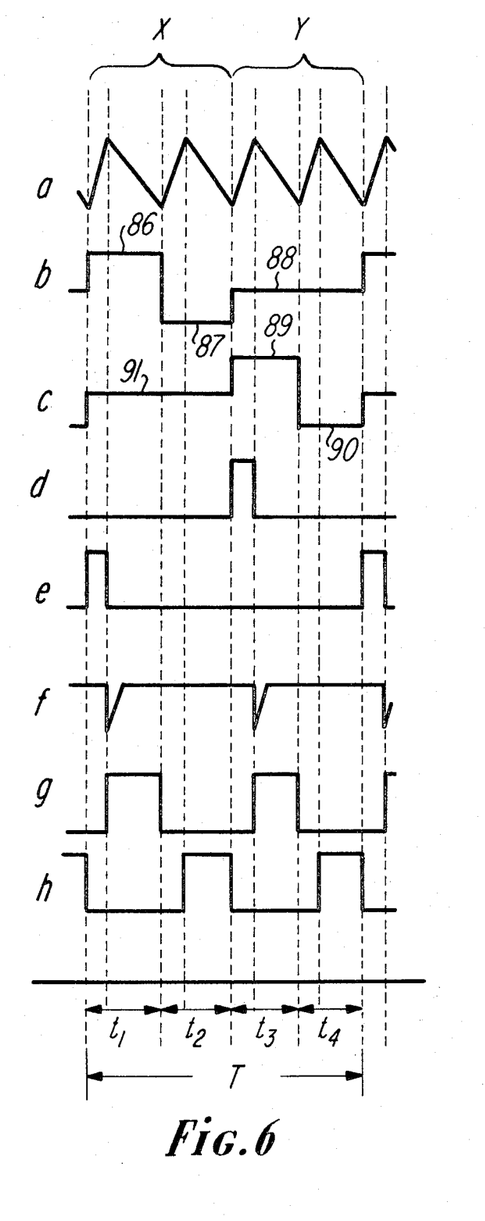
FIGS. 6 and 7 includes various waveforms useful in explaining the embodiment of FIG. 5.
Figure 7:
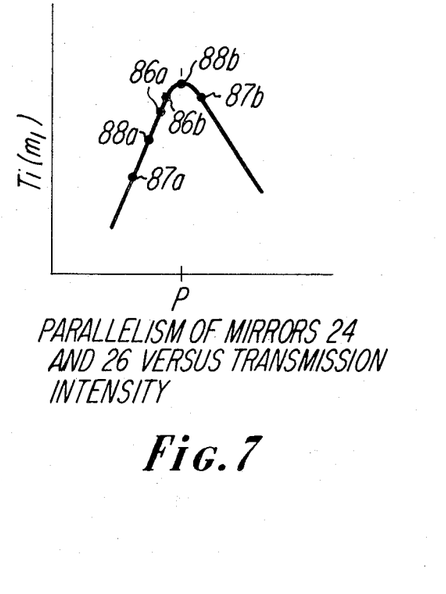

In describing the invention, first the multipassed feature will be presented in conjunction with FIGS. 3 and 4 and then the stabilization feature in conjunction with FIGS. 5, 6 and 7.

In FIG. 3 a schematic representation of a Fabry-Perot interferometer 23 is shown having a pair of spaced parallel mirrors 24 and 26. Mirror 24 is a scanning mirror which is caused to translate relative to mirror 26 in a direction 30 by a stack of transducers 28 secured to mirror 24. The non-scanning mirror 26 is rotatably mounted along an $x$ axis and a $y$ axis, these axes being substantially normal to each other. Thus the mirrors 24 and 26 are capable of being fully angularly oriented with respect to each other when mirror 26 is rotated about the $x$ and $y$ axes. Two angular orienting transducers 32 and 34 are secured to mirror 26 to control the rotation of mirror 26 about the $x$ and $y$ axes respectively. Suitable mirror mounting means are not shown. Transducers 28 and 32 and 34 cause their corresponding mirrors to be displaced in response to a signal applied to the transducers in a manner known in the interferometer art.

Retroreflector 36 is disposed spaced from mirrors 24 and 26 outside the optical cavity formed by the two mirrors. Retroreflector 36 is a corner cube or similar optical device for taking a beam of light incident thereupon and reflecting it back in a direction parallel to the incident beam a distance d between the beam such that the two beams are parallel but travelling in opposite directions.

Distance d is provided to prevent light being scattered between adjacent beams. The distance d between the multipassed beams is the same order of magnitude as the beam width e. Suitable screens (not shown) are provided to decrease the scattered light.

Incident beam 38 is processed by interferometer mirrors 24 and 26 and then emerges as an output beam or signal 40 which is then processed by the retroreflector 36 and emerges therefrom as beam or signal 42 which is again processed by mirrors 24 and 26 of the same single interferometer 23, the beam emerging from the interferometer as output signal 44.

The problem of displacing one beam or signal 44 a distance d from a second beam 38 is explained in conjunction with FIG. 4. In FIG. 4 like numerals refer to like parts of FIG. 3. In FIG. 4 an out of parallel condition is greatly exaggerated between mirrors 24 and 26. The incident beam 38 is shown displaced distance d from output signal 44, output signal 44 and input signal 38 being substantially parallel with respect to each other. As shown, mirrors 24 and 26 are angularly oriented with respect to each other in an out of parallel condition in only one direction with respect to the $y$ axis in the interest of clarity. In practice, additional angular disorientation will also take place about the $x$ axis.

With respect to incident beam 38 and its corresponding output signal 40 the mirrors 24 and 26 are displaced a mean distance $l_1$. This mean distance $l_1$ determines the frequency of the output signal 40. Output signal 40 is then processed through the retroreflector 36 of FIG. 3 and becomes input signal 42 to mirrors 24 and 26 in a direction reverse that of signal 38. The input signal 42 of the second pass and its corresponding output signal 44, being displaced a distance $d$ from the first pass, are now passed through the mirrors 24 and 26 a position in which the mirrors are spaced from each other a mean distance $l_2$. Due to the nonparallel condition of mirrors 24 and 26 the mean distance $l_2$ is substantially different from the mean distance $l_1$. If this difference of the two mean distances is sufficiently large, then the transmission intensity of the output signal 44 will be substantially reduced. The degree of parallelism required is roughly the same as would be required for a single passage of a beam occupying the same total extent (i.e. $d + 2e$) of the mirrors. A scanning interferometer is provided in which mirror 24 is displaced with respect to mirror 26 as explained previously while the angular orientation of the two mirrors with respect to each other is concurrently maintained within the required degree of parallelism.

To provide a stabilization system for a conventional single pass or for a multipass interferometer as described above a system in accordance with the present invention is provided as will be explained in conjunction with FIGS. 5 and 6.

In FIG. 5 like numbers refer to like parts of FIG. 3, the interferometer 23 of FIG. 5 being identical to the interferometer of FIG. 3. In FIG. 5, laser 50 provides the incident beam 38 to interferometer 23 through a series of lenses 51 and 52 and a mirror 53. The output signal 44 of the interferometer is collected and focused by lens 54 onto a suitable photomultiplier 55. The output voltage of photomultiplier 55 is applied via lead 56 to amplifier 57 to discriminator 58 along lead 59. One output of the discriminator is applied along lead 60 to utilization means not shown. The other output is applied along lead 61 to the stabilization system of the present invention now to be described.

The output current of the descriminator 58 along lead 61 manifests the intensity of beam 44, the instantaneous level of the output current of discriminator 58 corresponding to the instantaneous level of signal 44.

Output lead 61 of descriminator 58 is connected to the input terminals of a pair of switching field effect transistors 63 and 64 through a diode 62 the cathode of the diode being coupled to the input terminals of the transistors. The output terminal of transistor 63 is connected to a grounded capacitor 65 and to input terminal 70 of comparator 69. The output terminal of transistor 64 is connected to a grounded capacitor 66 and to input terminal 71 of comparator 69. The control terminal of transistor 63 is connected to terminal $10_u$ while the control terminal of transistor 64 is connected to terminal $10_h$. Input terminal 71 of comparator 69 is also connected to terminal $10_f$ through diode 72 while input terminal 70 of comparator 69 is connected to terminal $10_f$ through diode 73, the cathodes of each of the diodes 72 and 73 being connected together.

The output of comparator 69 which manifests the difference in magnitude of the voltages of the respective charged capacitors 65 and 66 is applied to one terminal of capacitor 74 through switching field effect transistor 76 and resistor 77, the other terminal of capacitor 74 being connected to ground. The output of comparator 69 is also connected to one terminal of a second capacitor 75 through a second switching field effect transistor 78 and a resistor 79. The other terminal of capacitor 75 is also connected to ground. The one terminal of capacitor 74 is also connected to input terminal 80 of a high input impedance difference amplifier 81 while the one terminal of capacitor 75 is connected to an input t terminal 82 of a second high input impedance difference amplifier 83.

The output signal of comparator 69 manifests the difference between the voltages of the charges stored on capacitor 65 and 66. This signal provides an error signal for controlling the shifting of the mean angular position of the mirrors with respect to each other in a manner to be explained and which is switched either to capacitor 74 or to capacitor 75 with the time constants determined by the respective values of the corresponding resistors and capacitors.

The second input 84 of amplifier 81 is connected to terminal $10_b$ while the second input 85 of amplifier 83 is connnected to terminal $10_c$. The output of amplifier 81 is connected to transducer 32 in interferometer 23, the transducer 32 controlling the angular orientation of mirror 26 about the $x$ axis. The output of amplifier 83 is applied to transducer 34 of interferometer 23 for angularly orienting mirror 26 about the $y$ axis. Transducer 28 coupled to terminal $10_a$, is a cylindrical stack of piezoelectric elements.

In describing the operation of the interferometer and stabilization system of FIG. 5, reference will be made to the waveforms of FIG. 6. The subscript of each of the terminals $10_{a-h}$ of FIG. 5 correspond to the same letter identifying each of the respective waveforms of FIG. 6. For example waveform a of FIG. 6 is applied to terminal $10_a$ of FIG. 5 and so on.

In FIG. 6 there is illustrated the various waveforms which control the operation of mirrors 24 and 26 of FIG. 5 wherein waveform a is a scanning ramp waveform which is applied to terminal $10_a$ to cause mirror 24 to scan in direction 30. Each scanning waveform occurring in any of the periods $t_1$ through $t_4$ represents a full scan of mirror 24. As shown there are four scans in a cycle T. The circuits and logic necessary to provide the various waveforms of FIG. 6 are well known. No description of such circuitry is necessary nor will be given for understanding the present invention.

When waveform a of FIG. 6 is applied to transducer 28 to cause mirror 24 to scan in the direction of arrow 30, the output signal 44 is collected and focussed by lens 54 onto photomultiplier 55. Each scan occurring in each period $t_{1-4}$ provides an output signal at photomultiplier 55 similar to the waveform b of FIG. 2 in a Brillouin experiment. In waveform b of FIG. 2 the frequency distribution of the incident wave at low transmission intensities are provided due to the high contrast of the double pass system of interferometer 23 as indicated previously.

Since each scan period $t_1$ provides a full waveform b of FIG. 2, then the four scans of each cycle T provide four repetitions of waveform b of FIG. 2. The discriminator output on lead 61 is an analog current proportional to the intensity in the spectrum. Only the peak intensities are measured by the diode 62.

However, the maximum level of the output signal $m_1$ and $m_2$ of FIG. 2 is provided only when the mirrors 24 and 26 are in parallel alignment within that degree indicated above. Temperature variations and mechanical drift in practice cause mirrors 24 and 26 to drift out of parallelism with respect to each other. This out of parallelism condition if uncorrected will substantially reduce if not eliminate the transmission intensity as manifested by waveform b of FIG. 2. Stabilization of mirrors 24 and 26 must be provided while mirror 24 is scanning with respect to mirror 26.

To provide this stabilization, the modulating signal waveform b of FIG. 6 is applied to amplifier 81, this signal causing mirror 26 to be displaced about the $x$ axis by means of transducer 32. In waveform b of FIG. 6 there is a positive pulse 86, a negative pulse 87 and a DC level 88. Note that the portion of cycle T in which the positive and negative pulses 86 and 87 respectively occur are designated the X portions of the cycle T which means mirror 26 is operated on about the $x$ axis in this cycle portion.

Pulses 86 and 87 cause mirror 26 to be angularly displaced with respect to mirror 24 from a given mean angular position, which position corresponds to the level of the signal of waveform b at 88. Thus mirror 26 is first angularly displaced in a first direction, for example, clockwise, about axis $x$ and, then it is angularly displaced in the opposite direction by pulse 87 in a counterclockwise direction about the $x$ axis. The angular displacement of mirror 26 by pulses 86 and 87 are by substantially the same angular incremental amounts about a mean given angular orientation of the mirrors with respect to each other as manifested by DC level 88. This mean angular orientation is maintained by the DC level of waveform b at 88, and occurs in that portion of cycle T as indicated by the Y bracket. At the end of the cycle T, the waveform b during subsequent cycles T is repeated.

Referring to FIG. 2, waveform b exhibits two different successive maximum transmission levels at each of maximum peak transmissions $m_1$ and $m_2$ during the X cycle portion of FIG. 6, since two scans will occur. The first level of output signal 44 at $m_1$ and $m_2$ will occur as the result of the angular orientation of the mirrors with respect to each other during the period of pulse 86 ($t_1$) and the second level of output signal 44 at the maximum transmission $m_1$ and $m_2$ will occur during pulse 87 ($t_2$).

If a plot were to be made of the transmission intensity $T_i$ of the output signal 44 of the interferometer at any given frequency versus the degree of parallelism between mirrors 24 and 26, the plot would appear as illustrated in FIG. 7. When the mirrors are perfectly parallel at P then a maximum transmission $t_{ip}$ occurs. When the mirrors vary from that degree of parallelism then the transmission intensity will decrease regardless of which way the degree of parallelism deviates from the perfect parallel orientation P.

Thus if the mean angular orientation of mirrors 24 and 26 during occurrence of waveform b (FIG. 6) at level 88 were not in that position in which the mirrors are perfectly parallel such as at P (FIG. 7) then the maximum transmission intensity would occur, for example, at the point designated 88a in FIG. 7. The mirrors are then angularly oriented with respect to each other by pulse 86 which for example places the mirror closer to the desired degree of parallelism and the maximum transmission would occur at a point designated 86a.

When a negative pulse 87 is applied to the mirrors angularly displacing the mirrors in the opposite direction, the mirrors are placed further apart with respect to the desired degree of parallelism and the transmission intensity would occur at a point designated 87a. These variations in transmission intensity at 86a and 87a represent successive peak transmissions at $m_1$ of waveform $b$ of FIG. 2, for example, and the output of discriminator 58 manifests these variations of transmission intensity.

During the period $t_1$ when the first scan occurs the maximum voltage is applied through diode 62 to the input terminal of transistor 63. At the same time waveform $g$ of FIG. 6 is applied to the gate or control terminal of transistor 63. A pulse as shown by waveform $g$ is applied to the control terminal of transistor 63 during period $t_1$ causing the current on lead 61 to be switched into capacitor 65 for storage and integration.

During the second scan period $t_2$ modulating pulse 87 of waveform $b$ of FIG. 6 causes a variation in the output signal 44 as described above which results in a corresponding variation in the current on lead 61. During period $t_2$ a pulse in the form of a waveform $h$ is applied to terminal 10 which pulse closes switching transistor 64 causing the current to flow from lead 61 through diode 62 through transistor 64 to be stored and integrated by capacitor 66.

Waveform $d$ of FIG. 6 is applied to terminal $10_d$ of FIG. 5, and, at the beginning of the period $t_3$, the pulse of waveform $d$ ($t_3$) is applied to the control or gate of switching transistor 76 causing this transistor to conduct passing the output signal from comparator 69 through resistor 77 to capacitor 74. The inputs applied to comparator 69 at input terminals 70 and 71 come from respective capacitors 65 and 66. If the charges in capacitors 65 and 66 differ from each other then comparator 69 will provide an output signal or error signal manifesting the difference. This error signal is caused to be applied to capacitor 74 through resistor 77 when switching transistor 76 is closed. The values of resistor 77 and capacitor 74 are chosen to have a time constant of the order of ten scans such that capacitor 74 will respond not to the error signal of one scan but to the average error signal over 10 scans. This prevents the system from hunting in response to each individual error signal occurring during each scan.

If by way of example, the time constant of the circuit is provided a period of two scans $t_{1-2}$ for X portion of the cycle then the charge on capacitor 74 due to the error signal produced in this period will be applied on input terminal 80 of high input impedance amplifier 81. This is a difference amplifier which together with the D.C. level 88 of waveform $b$ (FIG. 6) provides correction voltage to transducer 32.

This correction voltage will have a polarity and magnitude which manifests the algebraic difference of the successive maximum transmission intensities of the waveforms of FIG. 7 at points 86a and 87a. The polarity of the signal provided by amplifier 81 will be such as to cause transducer 32 to incrementally rotate or displace mirror 26 in that direction which tends to reduce the difference between the transmission intensities 86a and 87a. That is, they tend to move the mirrors closer toward their perfectly parallel orientation at P (FIG. 7). Thus, for the next cycle the mean angular orientation of the mirrors will provide an increased mean transmission intensity that is closer towards the maximum. With each cycle, this process is repeated.

As indicated, to prevent the system from hunting for each error signal and to provide an average error signal, a time constant is provided which is substantially greater than a single scan. To prevent cumulative summation of each of the error signals, waveform f of FIG. 6 is applied to terminal $10_f$. In waveform $f$, a negative pulse occurs immediately after the pulse of waveform $d$ which pulse will discharge capacitors 65 and 66 permitting these capacitors to be ready for the next Y portion of the cycle.

After the occurrence of a number of cycles in accordance with the degree to which the mirrors are beyond the perfectly parallel angular orientation, the mean angular position of mirror 24 and 26 with respect to each other will be shifted to a point approximately at the maximum transmission intensity designated 88b in FIG. 7. At this time the pulse 86 will provide a transmission intensity at the level designated by 86b while pulse 87 being of the same value as 86 with respect to the mean level 88 in the opposite direction will cause the transmission intensity of the system at the output signal to have a level designated at point 87b. The levels at 86b and 87b are approximately equal at this point and no error signal will be produced, since it is the levels at 86b and 87b which will be compared to provide an error signal.

Thus when temperature and mechanical fluctuations cause mirrors 24 and 26 to deviate from the given degree of parallelism about the $x$ axis represented by P of FIG. 7, then the stabilization system described above in accordance with the present invention will incrementally re-orient the mirrors about that degree of parallelism in which the transmission intensity of signal 44 is at a maximum.

However, the mirrors may still be out of parallel in the direction about the $y$ axis. Stabilization with respect to the $y$ axis is provided in accordance with the present invention in a manner similar to that provided with respect to the stabilization about the $x$ axis. Namely, in a later portion of the same cycle T indicated as Y in FIG. 6, waveform $c$ is provided having a D.C. level at 91 in periods $t_{1-2}$, a positive pulse 89 occurring in period $t_3$, and a negative pulse 90 occurring in period $t_4$. Pulses 89 and 90, which occur in the period designated Y, are applied to terminal $10_c$ of FIG. 5.

It is to be noted that while mirror 26 is rotated with respect to the x axis, a D.C. level 91 is applied to the $y$ axis in the X portion of the cycle.

Conversely, during the Y portion of the cycle D.C. level 88 is applied to the X transducer while the Y transducer will cause mirror 26 to be displaced about the Y axis in opposite directions by a given incremental amount. This incremental displacements of mirror 26 about the $y$ axis provides an output signal 44 whose intensity will vary as described above with respect to the $x$ axis.

During period $t_3$, the analog current on lead 61 initiated by pulse 89 of waveform $c$ is applied through diode 62 and switching transistor 63 to capacitor 65, transistor 63 being closed by the pulse in waveform $g$ of FIG. 6 that occurs in period $t_3$. It is assumed that the pulses of waveform $f$ of FIG. 6 which discharge capacitor 65 and 66 occur almost instantaneously and do not substantially interfere with the charging of capacitor 65 during period $t_3$.

Likewise during period $t_4$ the pulse 90 of waveform $c$ incrementally rotates the mirrors 24 and 26 with respect to each other in an opposite direction thus providing an output signal 44 whose level will be different than the output signal provided by pulse 89 when the mean angular position about $y$ axis at this time does not correspond to a maximum transmission of output signal 44 at P (FIG. 7). The analog current on lead 61 in period $t_4$ is applied by diode 62 through transistor switch 64 to capacitor 66, remembering that capacitor 66 has been previously discharged by diode 72 when a pulse of waveform $f$ occurred in period $t_3$.

Switching transistor 64 is closed by a pulse provided by waveform $h$ applied in period $t_4$ at terminal $10_h$. At the end of the cycle portion indicated by $y$ in FIG. 6, the charges made on capacitor 65 and 66 are applied to the input terminal 70 and 71, respectively, of comparator 69 which in turn generates an error signal as described. The error signal at the output of comparator 69 is then applied to capacitor 75 through resistor 79 by way of switch 78 which is closed by a pulse of waveform $e$ that occurs at the end of period $t_4$ and which is applied to terminal $10_e$.

Thus, the error signal manifesting those errors corresponding to the $x$ axis are passed only to capacitor 74 by way of switching transistor 76 and the error signals manifesting the error about the $y$ axis are transmitted to only capacitor 75 by transistor switch 78. These stored error signals in capacitor 74 and 75 are applied respectively to amplifiers 81 and 83 for correcting he mean angular orientation position of mirror 26 with respect to mirror 24 about the corresponding $x$ and $y$ axes, respectively.

When there is no error in the degree of parallelism between mirror 24 and 26, the charges on capacitor 65 and 66 will be substantially the same as described above and no error signal is provided by comparator 69. It is clear that capacitor 65 and 66 will store the analog current manifesting the transmission intensity variations during each of the angular rotations of mirror 26 about the $x$ and $y$ axes. These stored charges are then compared for producing the error signal.

It is to be understood that during a scan more than one peak may be provided by output signal 44 such as shown by waveforms $a$ and $b$ of FIG. 2, that is, in waveform $b$ of FIG. 2 there are two peaks $m_1$ and $m_2$. In practice, there may be more than two peaks provided.

It will be appreciated that while the embodiment of FIG. 5 was described utilizing a Fabry-Perot interferometer using a two pass optical system in accordance with the present invention, in practice several factors which are taken into consideration may require additional passes. The factors which are utilized for optimizing the maximum transmission and contrast ratio of the output signal 44 of FIG. 5 include mirror diameter, mirror quality, reflectivity of the mirror surfaces, beam diameter, and the total number of passes.

Each of the mirrors have a certain degree of absorption and a certain degree of reflectivity. However, there is a practical limit to the number of passes that can be fitted into available mirror area as known in the art. Absorption in the retroreflectors increases with the number of passes but in practice this need not be appreciable. To provide additional number of passes it is clear that more than one retroreflector may be used on opposing sides of mirrors 24 and 26. That is, a retroreflector may be disposed on the other side of mirror 24 adjacent transducer 28 to provide a multiple number of passes back and forth through mirrors 24 and 26.

In an instrument constructed in accordance with the present invention, two retroreflectos were utilized having five passes with a beam diameter of 7 millimeters and a mirror diameter of 30 millimeters, the mirrors having a reflectivity of 87 percent and being matched flat to $\lambda/100$ before coating. The contrast ratio C for each pass measured about 100 and the overall contrast for five passes exceeded $10^9$. The overall transmission was in excess of 50 percent.

Thus, there has been shown in accordance with the present invention, a multi-pass interferometer which has a greatly improved contrast ratio over conventional Fabry-Perot interferometers. An instrument may be provided which has a contrast ratio which is more than five orders of magnitude greater than that obtainable using a standard instrument. The instrument in accordance with the present invention has long term stability, its stability being achieved by a feedback system which offers clear advantages over thermal stabilization systems alone. That is, all sources of misalignments are compensated for, stability is achieved within seconds of switching on and the stabilized instrument is automatically aligned without any separate independent aligning operation necessary.

What is claimed is:

1. a Fabry-Perot interferometer utilizing a pair of spaced mirrors which can be angularly oriented with respect to each other, said interferometer providing an output signal in response to incident wave energy, said output signal having a level at any certain value of angular orientation of said mirrors, said level being a function of the absolute value of the difference between that certain value and a predetermined value thereof at which said output signal is a maximum, first means coupled to said mirrors for cyclically rotating said mirrors with respect to each other by a given incremental amount in one direction about an axis from a mean angular position during a first portion of each cycle and by substantially said given incremental amount in an opposite direction about said axis from said mean angular position during a second portion of each cycle, second means for measuring said output signal, third means including storage means coupled to said first and second means for comparing the measured output signal produced during the first portion of a cycle with the measured output signal produced during the second portion of that cycle to generate an error signal manifesting the algebraic difference between said compared signals, and fourth means coupled to said first and third means and responsive to said error signal for shifting the mean angular position of said mirrors in accordance with the error signal, which shifting tends to reduce the magnitude of said error signal whereby the mean position of said mirrors is shifted toward said predetermined value.

2. The circuit of claim 1 further including fifth means coupled to said mirrors for cyclically rotating said mirrors with respect to each other by a given incremental amount in one direction about another axis orthogonal to said first mentioned axis from another mean angular position during a third portion of each cycle and by substantially said last mentioned given incremental amount in an opposite direction about said other axis from said other mean angular position during a fourth portion of each cycle,
   said third means including said storage means further including means coupled to said second and fifth means for comparing the measured output signal produced during the third portion of a cycle with the measured output signal produced during the fourth portion of that cycle to generate another error signal manifesting the algebraic difference between said last mentioned compared signals,
   said fourth means being coupled to said fifth means and responsive to said other error signal for shifting the other mean angular position of said mirrors in accordance with said other error signal, which shifting tends to reduce the magnitude of said other error signal whereby said other mean position of said mirrors is shifted toward said predetermined value.

3. The circuit of claim 2 wherein said third means includes a capacitor coupled to said second means and said comparing means for storing the measured output signal produced during one of said first and second cycle portions and including means for applying said stored output signal to said comparing means during the other of said first and second cycle portions for comparing the measured output signal produced during each of said first and second cycle portions, said third means further including discharge means coupled to said capacitor for discharging said stored signal at the end of said second cycle portion.

4. The circuit of claim 3 wherein said third means includes gating means coupled between said capacitor and said second means, said gating means being responsive to a control signal applied thereto for selectively passing only the measured output signal to be stored to said capacitor.

5. The circuit of claim 2 further including sixth means coupled to said mirrors to cyclically translate said mirrors with respect to each other in response to a scanning signal applied to said sixth means for scanning said incident wave energy to thereby produce an output signal of varying levels, each scanning cycle corresponding to a separate, different rotating cycle portion,
   said measured output signal varying proportionately with said varying levels,
   said third means including integrating means coupled to said storage means and said second means for integrating the varying measured output signal produced in each of said cycle portions, a separate integrated signal corresponding to a different cycle portion, said third means including means for comparing the integrated signals corresponding to the first and second cycle portions with each other and for comparing the integrated signals corresponding to the third and fourth cycle portions with each other.

6. The circuit of claim 5 wherein said third means includes gating means coupled between said integrating means and said second means for selectively passing said varying measured output signal produced during each cycle portion to separate respective integrating means.

7. The circuit of claim 6 wherein said third means includes discharge means coupled to said integrating means for discharging said integrating means at the end of said second and fourth cycle portions, said integrating means including different separate means for separately sequentially integrating the varying measured output signal produced in said first and third cycle portions, and for integrating the varying measured output signal produced in said second and fourth cycle portions, respectively.

8. The circuit of claim 7 wherein said integrating and storing means includes first and second capacitors, each capacitor having a pair of terminals, and said gating means includes first and second switches, each switch having an input terminal, an output terminal and a control terminal,
   said comparing means having a pair of input terminals and an output terminal,
   one terminal of said capacitors being connected to a reference potential, the other terminal of said first capacitor being connected to an output terminal of said first switch and an input terminal of said comparing means, the other terminal of said second capacitor being connected to an output terminal of said second switch and the other input terminal of said comparing means, the input terminals of said switches being coupled to said second means, the control terminal of said switches being coupled to a source of control signals for causing the selective passing of said varying measured signal to said integrating means, the output terminal of said comparing means being coupled to said fourth means.

9. The circuit of claim 8 wherein said discharge means includes a pair of unidirectional devices each device having a pair of terminals, one terminal of each device being connected to a different, separate one of said other capacitor terminals and being poled to flow current from said capacitors in response to a control signal applied to the other respective terminals of said devices.

10. The circuit of claim 5 wherein said fourth means includes first and second storing means each coupled to a different one of said first and fifth means, and gating means coupled to said first and second storing means and to said comparing means, said gating means selectively passing a different one of said error signals to a separate different one of said storing means in response to a control signal applied to said gating means, the error signal produced by said first means being stored by the storing means coupled to said first means and the error signal produced by said fifth means being stored by the storing means coupled to said fifth means.

11. The circuit of claim 10 wherein said first storing means includes a first capacitor and said second storing means includes a second capacitor, each capacitor having a pair of terminals,
- said fourth means including a pair of difference amplifiers, each amplifier having two input terminals and an output terminal, a pair of transducers each having an input terminal, each transducer being coupled to one of said mirrors for angularly rotating said mirrors with respect to each other about a separate, different one of said axes in response to a signal applied to said transducer input terminal,
- said gating means including a pair of switches each switch having a control terminal, an input terminal and an output terminal, said switch input terminals being coupled to said comparing means, said switch output terminals each being coupled to said one input terminal of a different amplifier,
- the output terminal of each amplifier being respectively coupled to separate, different ones of said transducer input terminals,
- a terminal of one capacitor being coupled to said one input terminal of one amplifier and a terminal of the other capacitor being coupled to said one input terminal of the other amplifier, the other terminals of said capacitors being coupled to a reference potential.

12. The circuit of claim 2 wherein said first and fifth means each includes a pair of transducer means each having an input terminal and coupled to said mirrors, said transducer means each angularly displacing at least one of said mirrors with respect to the other mirror about a different respective one of said axis in response to a signal applied to the input terminal of that transducer corresponding to said one axis.

13. The circuit of claim 12 wherein said first and fifth means includes means for applying a control signal at the input terminal of each of said transducer means, the control signal applied to one of said pair of transducer means causing said mirrors to cyclically rotate said first mentioned incremental amounts during said first and second cycle portions and for maintaining said mirrors at said first mentioned mean angular position during said third and fourth cycle portions about said first mentioned axis, the control signal applied to the other of said pair of transducer means causing said mirrors to cyclically rotate said second mentioned incremental amounts during said third and fourth cycle portions and for maintaining said mirrors at said other mean angular position during said first and second cycle portions.

14. A stabilized Fabry-Perot interferometer utilizing a pair of spaced mirrors which can be angularly oriented with respect to each other, said interferometer providing an output signal in response to incident wave energy impinging upon said mirrors at a given location thereon, said output having a level which is a function of any certain value of said orientation of said mirrors with respect to each other and any certain location on said mirrors at which said wave energy impinges, said interferometer comprising:
- an unstabilized single Fabry-Perot interferometer including at least one retroreflector coupled to said interferometer to obtain at least two passes of said incident wave energy on said mirrors, the incident wave energy of each pass being displaced from each other that distance by which the wave energy in each of said passes is processed by said interferometer substantially without interaction with the wave energy of the other pass, and
- stabilizing means coupled to said mirrors for stabilizing the angular orientation of said mirrors with respect to each other about a given degree of parallelism beyond which degree the level of said output signal is substantially reduced.

15. The interferometer of claim 14 wherein said interferometer further includes means coupled to said mirrors for causing said mirrors to scan said incident wave energy.

16. The interferometer of claim 14 wherein said interferometer includes a pair of retroreflectors coupled to said mirrors, said retroreflectors being disposed in spaced relationship with respect to each other and said mirrors for obtaining at least five passes of said incident wave energy on said mirrors, each pass being displaced from the remaining passes by said distance.

17. The interferometer of claim 16 wherein said incident wave energy is formed of a beam of wave energy and undesirable stray wave energy, said interferometer further including means disposed between each of said retroreflectors and said mirrors for passing substantially only said beam of energy therebetween.

18. The interferometer of claim 14 wherein said stabilization means includes means coupled to said mirror for cyclically rotating said mirrors with respect to each other by a given incremental amount in one direction about an axis from a mean angular position during a first portion of each cycle and by substantially said given incremental amount in an opposite direction about said axis from said mean angular position during a second portion of each cycle,
- means for measuring said output signal,
- means including storage means coupled to said rotating means and said measuring means for comparing the measured output signal produced during the first portion of a cycle with the measured output signal produced during the second portion of that cycle to generate an error signal manifesting the algebraic difference between said compared signals, and
- means coupled to said rotating means and said error signal generating means and responsive to said error signal for shifting the mean angular position of said mirrors in accordance with the error signal, which shifting tends to reduce the magnitude of said error signal.

* * * * *